Nov. 2, 1926.                                                         1,605,576
                            J. BERGE
              ODOMETER AND SPEEDOMETER MECHANISM
                     Filed April 14, 1919          3 Sheets-Sheet 1
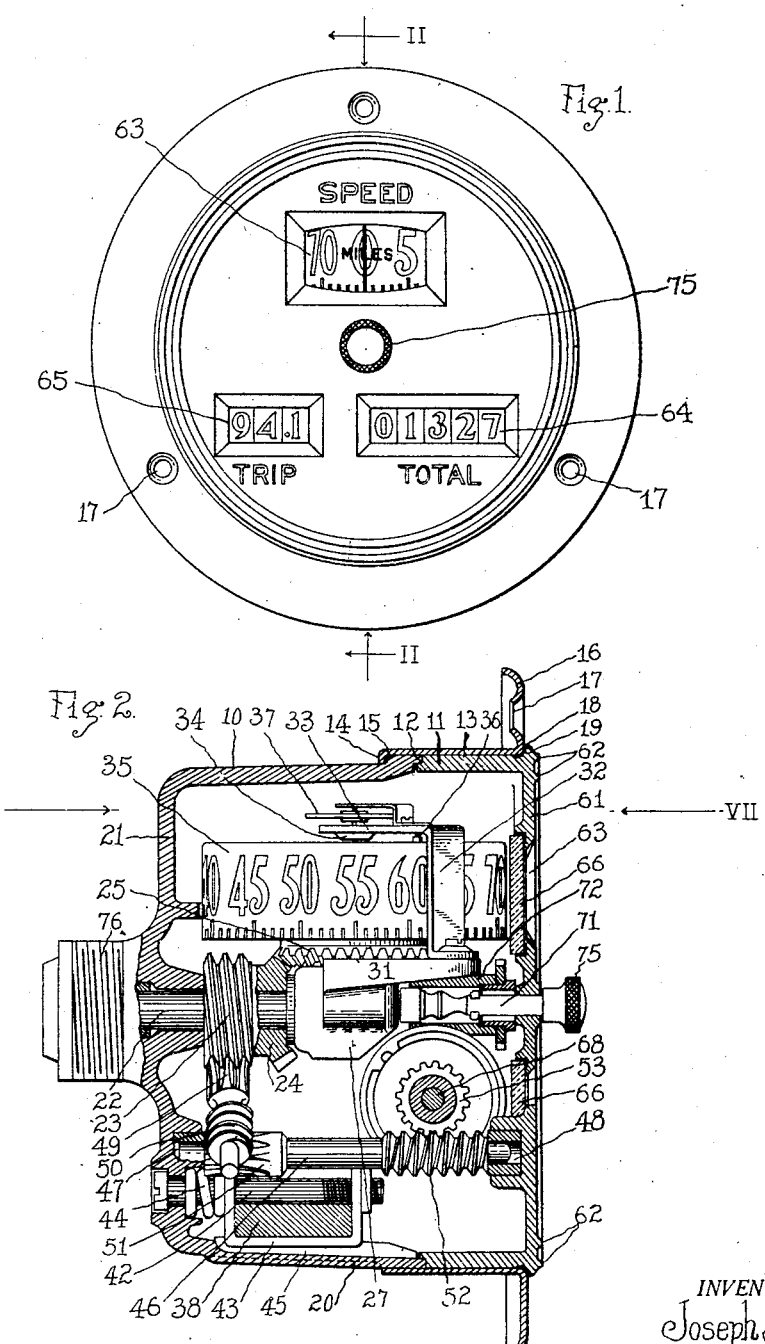
INVENTOR.
Joseph Berge
BY
Lloyd Blackmore
ATTORNEY.

Nov. 2, 1926.  1,605,576
J. BERGE
ODOMETER AND SPEEDOMETER MECHANISM
Filed April 14, 1919    3 Sheets-Sheet 2
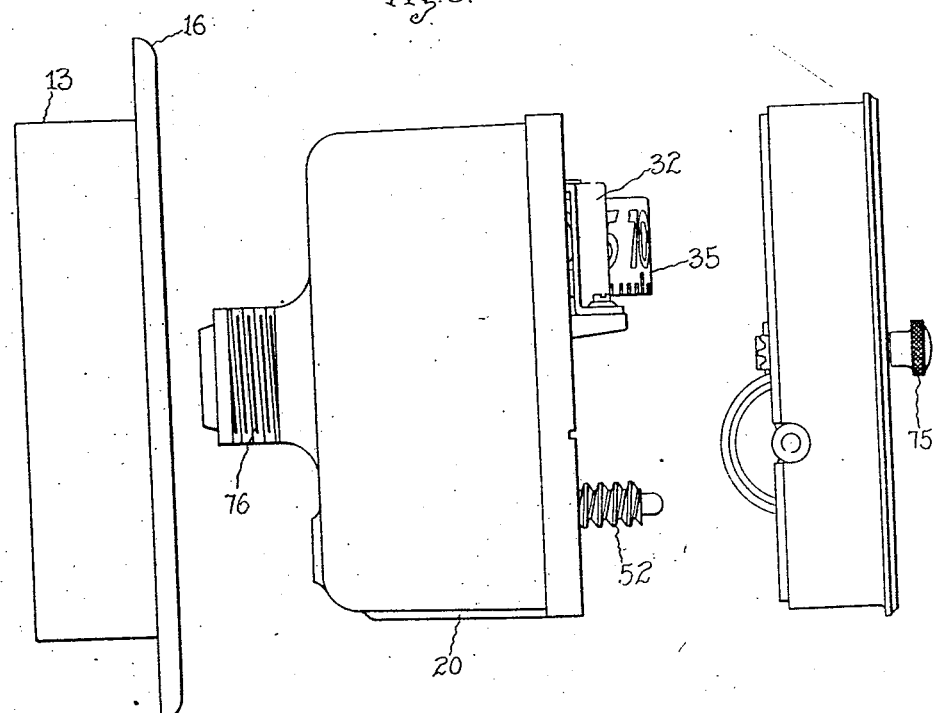
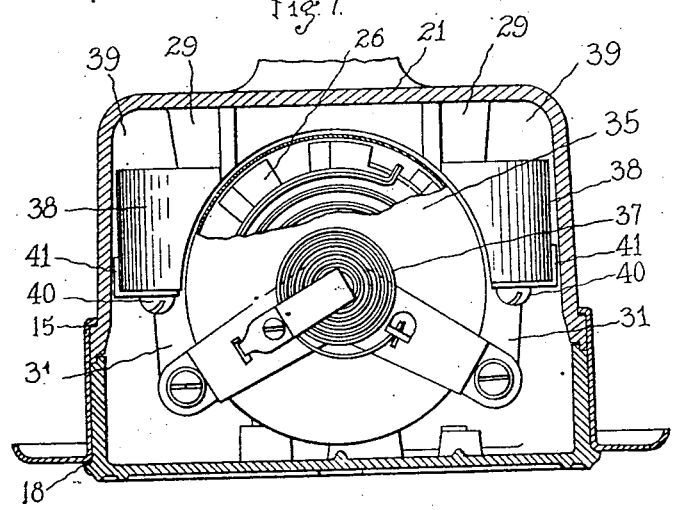
INVENTOR.
Joseph Berge
BY
ATTORNEY.

Nov. 2, 1926.                              1,605,576
J. BERGE
ODOMETER AND SPEEDOMETER MECHANISM
Filed April 14, 1919        3 Sheets-Sheet 3
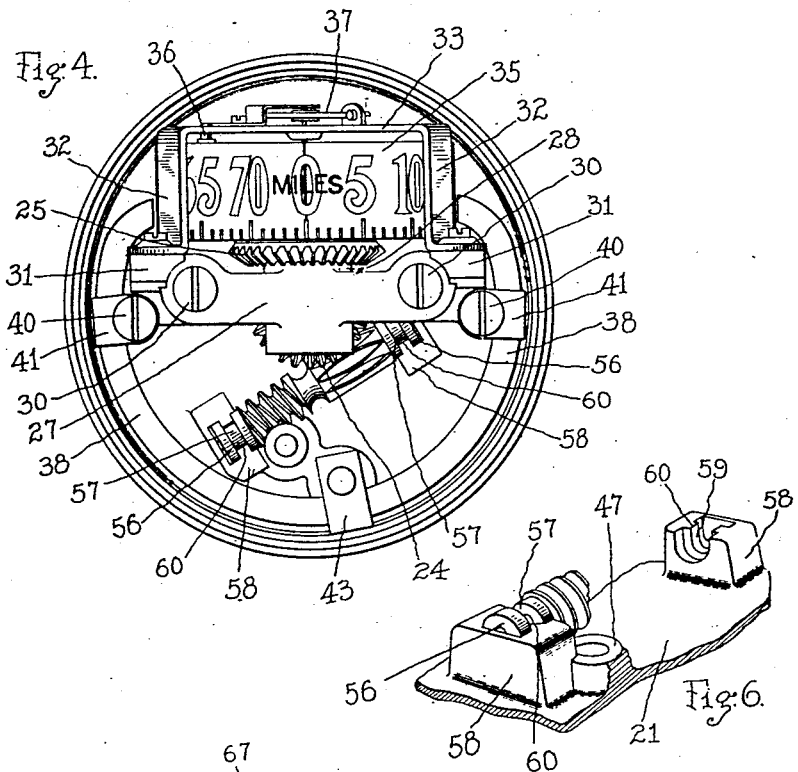
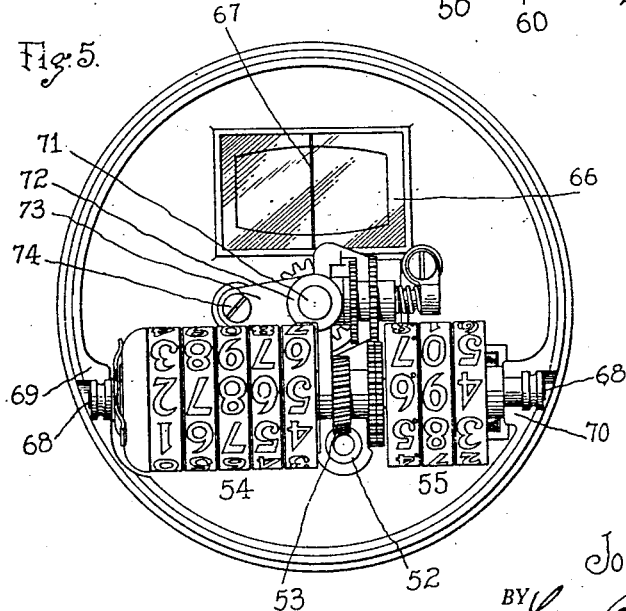
INVENTOR.
Joseph Berge
BY
Lloyd Blackmore
ATTORNEY.

Patented Nov. 2, 1926.

1,605,576

UNITED STATES PATENT OFFICE.

JOSEPH BERGE, OF FLINT, MICHIGAN, ASSIGNOR TO A C SPARK PLUG COMPANY, OF FLINT, MICHIGAN, A CORPORATION OF MICHIGAN.

ODOMETER AND SPEEDOMETER MECHANISM.

Application filed April 14, 1919. Serial No. 289,821.

My invention relates to speedometers designed for use with self propelled vehicles to indicate the speed at which the same is moving, and including also registering or odometer mechanism for registering the distance travelled by the vehicle, and particularly to speedometers of the magnetic type wherein a light and delicately supported metallic speed cup or equivalent speed indicating member having characters to indicate the rate of movement per unit time is dragged along by the action of an armature rotating in a magnetic field in which the speed cup or equivalent element is located, the extent or degree of the rotary or angular movement of the speed indicating member being dependent upon the speed at which the armature is rotated through suitable driving mechanism from a wheel of the vehicle, and such angular movement being opposed by a hair spring operatively connected with the said indicating member.

The principal object of my invention is to provide certain improvements in and relating, generally, to speedometers of the class or type above referred to, the same including certain structural features of the casing of the instrument, the location of the separate mechanisms concerned, respectively, with the speed indicating and with the distance traveled registering functions relative to the casing or shell of the instrument, and the arrangement and disposition of said mechanisms relative to one another, all with the end in view of providing a speedometer which may be more readily and cheaply manufactured and assembled than has heretofore commonly been the case.

A further object of my invention is to provide an improved casing structure made up of two separate and distinct casing members or sections, and wherein the metal cutting or boring operations necessary for the production of the said sections may for the most part be performed by imparting relative rotary motion to the casing section being operated upon and to a metal cutting or boring tool about a single axis, or about a plurality of axes parallel with one another, the two casing sections when finished and the operating mechanism of the instrument properly assembled therein being secured together in a permanent manner to provide a unitary hollow closed casing therefor, the casing thus provided being dustproof and water-tight, and the bearings for the operative elements of the device being for the most part entirely within and protected by the wall of the casing.

A further object of my invention is to provide an improved speedometer of the type or class above referred to and in which the speed indicating mechanism of the instrument is located entirely within one of the two sections of the casing thereof, and the odometer mechanism in the other, the casing members being annular in cross section and cup shape in form, the bearing for the main driving shaft of the instrument being formed in the end wall of and having its axis coincident with the axis of the casing section within which the speed indicating mechanism is located, while the end wall of the section which contains the odometer mechanism supports or carries a resetting member adapted to move along and rotate about an axis coincident with the axis of the casing and with that of the main driving shaft.

A further object of my invention is to provide improved means whereby the rotating armature and the speed cup of the instrument may be assembled and adjusted independently of the other mechanism thereof, and then introduced into the speed indicating casing section and secured in place therein independently of the other elements of the speed indicating mechanism, and a further object of my invention is to provide certain improvements in and relating to the end wall of the odometer section of the casing which supports a resetting member for said mechanism in a central position, and has openings or windows through which the speed indicating cup and the distance traveled registering mechanism may be seen.

With the above and other objects of invention in view, my invention consists in the improved magnetic speedometer and subordinate parts and subcombinations and separate features thereof illustrated in the accompanying drawings and hereinafter described and claimed, and in such variations and modifications thereof as will be obvious to those skilled in the art to which my invention relates.

In the drawings accompanying and forming a part of this specification and wherein the preferred embodiment of my invention is illustrated:

Figure 1 is a view showing my improved magnetic speedometer in end elevation, and as seen from a position in front thereof when the same is in use;

Figure 2 is a view showing a section taken upon a vertical central plane extending longitudinally of the instrument and indicated by the line 2—2, Figure 1;

Figure 3 is a view showing the two sections of the casing in side elevation and with the speed indicating mechanism assembled in one, and the odometer mechanism in the other of said sections, preparatory to securing the sections together by the sleeve, also shown in this view.

Figure 4 is a view showing the speed indicating mechanism in elevation and assembled in its casing section or member;

Figure 5 is a similar view showing the odometer mechanism assembled within its casing member or section;

Figure 6 is a fragmentary view showing a detail of my device, and

Figure 7 is a view showing a section taken upon a horizontal plane indicated by the line 7, 7, Figure 2, looking down, the casing, however, being shown as sectioned upon a lower and substantially centrally located plane.

Referring now to the drawings, the exterior shell or casing of my improved magnetic speedometer is made up of two parts or sections 10, 11 each of which is cup-shape in form and annular in cross-section, and the open ends of which sections abut one with the other along a joint indicated by the numeral 12, the meeting edges of the peripheral walls of said sections preferably being rabeted, as shown, to more effectively prevent lateral displacement of the casing members, and to facilitate the assembling of the sections. The casing members or sections 10, 11 are secured together to thereby provide a closed dust and water tight shell or casing within which all the parts of my improved speedometer are located and held in proper operative relation with one another by means of a band or ring 13 having an inwardly extending flange 14 which engages a circumferentially extending ledge or shoulder 15 adjacent the open end of the casing member 10, and which band is of such a diameter relative to the diameter of the meeting ends of the casing members that considerable force is necessary to force it into the position shown in which it overlays the joint between and holds the two casing members together, because of the excessive friction between its inner surface and the portions of the casing, particularly the section 11 thereof, which it overlays, and which results from the force fit provided for in making the parts involved therein. The ring 13 or equivalent securing member covers the entire peripheral surface of the casing section 11 in the embodiment of my invention illustrated, and is preferably provided with an outwardly extending flange 16 having screw holes 17 whereby the instrument may be secured in place in an opening provided in a dash or instrument board, and the width of the said securing member is preferably such that its end 18 abuts against a peripherally extending flange 19 provided upon the section 11 when the ring is in its final position. A suitable varnish or coating may be applied to the surfaces of the casing members to be covered by the ring before the same is forced onto the casing, to thereby secure additional tightness and security between the ring and the casing members or sections. The section member 10 is shown as provided with a key 20 extending at right angles to the shoulder 15, and the flange 14 as cut away at the location of the key, in order to insure a definite and predetermined angular relationship between the casing as a whole and the holding and locking ring 13.

The casing members 10, 11 are commonly made of a non-magnetic metal, such as brass or aluminum, in which case the ring 13 will be made of iron, in order to provide a magnetic shield for the instrument and preserve the accuracy thereof when, for example, the same is placed in an opening in an iron or pressed steel dashboard, it being appreciated that the said ring is in place when the instrument is calibrated and adjusted, for it is forced onto the casing during the manufacture of the device and for the purpose of holding the casing elements together, and is not intended to be afterward removed except as such a course may be necessary to repair the instrument.

The casing provided by the casing members or sections 10, 11 is cylindrical in form, and the bottom or end wall 21 of the section 10 is provided with a centrally disposed bearing for the main driving shaft 22 of the instrument, the said shaft being driven from the wheel of the vehicle with which the device is used by and through any suitable driving means, and the same being centrally located relative to the casing and rotating about an axis which coincides with the axis of the casing in the embodiment of my invention illustrated and herein described.

The driving shaft 22 carries a worm 23 which operates the distance traveled registering or odometer mechanism of my device, and also a bevel gear 24 which meshes with a second bevel gear 25 through which the rotating armature 26 of the device is driven, the said gear 25 being supported from a supcoincident with the axis of the main driving shaft 22 and with the casing as a whole, and, upon pulling the said member outwardly, the same is brought into operative engagement with resetting mechanism which forms the subject-matter of another application, whereupon and upon rotating the said member by means of a knob 75 thereupon, the trip odometer wheels may be reset to a zero reading.

It will be appreciated that the fact that the exterior and interior surfaces of the casing member 10, the bearing for the main driving shaft 22, the threaded boss 76 (which has to do with the connection of the driving shaft through which the instrument is driven therewith), and the joint at the open end of the said casing member, are all concentric with one another, permits all the parts or surfaces to be finished at a single chucking operation, and at a minimum of expense, and that the axes of the holes for the magnet holding and adjusting screws, for the holding screws 30 for the supporting bracket 27, and for the bearing for one end of the odometer driving shaft 46, being parallel with the axis of the casing member and the driving shaft permits these last mentioned holes to be formed with a minimum of expense and by the use of comparatively simple jigs, fixtures or other devices used in making the casing section in question. Likewise all the operations necessary to be performed upon the casing member 11 may be performed at a minimum of expense, the bearing for the resetting member 71 being concentric with all the surfaces of the said section which have to be finished, which surfaces again are concentric with one another. In fact every machine operation, with the exception of that necessary to provide the seats for the bearings for the element 49—50, and for the odometer shaft 68, may be performed by relatively rotating the casing members and the tool which operates upon them about a single axis, or about axes parallel with one another, and the bearing for the element 49—50 and for the odometer shaft being, as will be observed in planes at right angles to the axes hereinbefore referred to, require ordinary and easily performed machine operations and comparatively simple jigs or equivalent devices for their production. Finally, a dust and water proof casing is provided and all the bearings of the device are either located entirely within the casing members or are covered by the sleeve 13, which is in fact a part of the casing of the finished and assembled instrument as it is actually sold and used, thus avoiding the necessity of drilling through the wall of the casing to provide bearings for the various operating elements of the instrument, and the fact that the main driving shaft extends through an end wall of the casing provides for a more convenient disposition of the shaft through which the instrument is driven from a wheel of the vehicle, and for an arrangement of said last mentioned shaft such that it is inaccessible to and out of the way of the operator of the vehicle, as the same is entirely upon that side of the dash or instrument board which is remote from the operator.

Having thus described and explained my invention, I claim and desire to secure by Letters Patent:

1. In a device of the class described, two cup-shaped casing sections annular in cross-section, the peripheral walls of which abut with one another whereby a hollow closed casing is provided; an annular securing member overlying the joint between said sections whereby they are held together; a flange carried by said securing member whereby the instrument may be secured in place in an opening provided to receive it, and indicating mechanism located within said casing and visible from a position outside the same.

2. In a device of the class described, two cup-shaped casing sections annular in cross-section and the peripheral walls of which abut with one another whereby a hollow closed casing is provided, and one of which members is provided with a circumferentially extending ledge or shoulder adjacent its open end; an annular securing member overlying the joint between said sections and having an inwardly extending flange at one of its ends adapted to abut against said ledge, and which securing member holds said sections together; an outwardly extending flange carried by said securing member and located at the other end thereof whereby the instrument may be secured in place in an opening provided to receive it and indicating mechanism located within said casing and visible from a position outside the same.

3. In a device of the class described, two cup-shaped casing sections annular in cross-section and the peripheral walls of which abut with one another whereby a hollow closed casing is provided, and one of which members is provided with a circumferentially extending ledge or shoulder adjacent its open end; an annular securing member overlying the joint between said sections and serving to hold them together and having an inwardly extending flange which abuts against said ledge, and the width of which securing member is such that it overlays the entire peripheral surface of the other of said casing sections; an outwardly extending flange carried by said securing member and located at the end thereof opposite said first mentioned flange whereby the instrument may be secured in place in an opening cerned with its operation may be assembled as a unitary mechanism carried by the bracket or support 27, and the unit thus assembled secured within the casing section 10 by the screws 30, thus greatly facilitating the assembling of the device and reducing the expense incident thereto.

The worm 23 carried by the main driving shaft 22 meshes with a pinion 49, and this pinion is formed integrally with a worm 50 which is in mesh with a pinion 51 upon the odometer driving shaft 46 hereinbefore referred to. The shaft 46 carries a worm 52 which meshes with a pinion 53 and through which a set of total or season odometer discs or wheels designated collectively by the reference numeral 54, and a set of trip odometer discs or wheels designated collectively by the reference numeral 55, are operated, the elements aforesaid constituting means whereby and through which the odometer mechanism is operated by and from the main driving shaft of the instrument.

The end of the combined pinion and worm gear element or member 49—50 are supported in bearings which in turn are supported from the end wall 21 of the casing member 10, and the same is rotatable about an axis lying in a plane which extends at right angles to the axis of the main driving shaft 22, said bearings being shown as provided by sleeves 56 having holes to receive pivots at the ends of the said combined member, and which sleeves are provided each with a circumferentially extending groove 57. These sleeves fit into seats so shaped as to receive them and which seats are formed in lugs 58 formed integrally with the end wall 21, each seat having a ridge 59 adapted to lie within a groove 57, and the free ends of which, indicated at 60, may be swaged by means of a suitable tool, after the bearings have been placed upon the ends of the element 49—50 and introduced into their seats, to thereby expand the metal of the ridges and cause it to overlay the exposed portion of the bottoms of the grooves, to thereby hold the bearing in place, as will be understood.

The end of the casing member or section 11 which contains the odometer mechanism is closed by an end wall 61 having a flange at its periphery, and one or more peripherally extending annular ridges 62 which are finished or smoothed to present a pleasing appearance, and which flange provides a ledge or shoulder for the end of the sleeve or band 13 and the inner portion of the flange 16 to abut against, while the remaining area of the said end wall is depressed, and is commonly unfinished, thus providing strength at the periphery of the wall where strength is needed, while at the same time providing a scheme whereby the cost of manufacture is much reduced. This end wall is provided with a bevelled opening or window 63 through which the figures on the speed cup 35 may be seen, and with two other bevelled openings or windows 64, 65 located respectively in front of the total and trip odometer discs 54, 55. These openings are glazed by glass, mica, or like transparent members 66 cemented or otherwise secured in recesses formed in the inner surface of the end wall 61, thus providing a cheaper and more desirable construction than is secured in devices wherein a corresponding wall is made entirely of glass, which is ordinarily specially formed and requires a special and often an expensive mechanism, member or device for holding it in place. The glass which extends across the opening 63 is provided with a single vertical crossline 67, whereby the speed at which the vehicle is going may be the more accurately judged.

Both the trip and the total sets of odometer discs or wheels are supported upon a single supporting shaft 68 extending at right angles to the main driving shaft 22 and parallel with the end wall of the section 11, and the ends of which shaft are journaled in bearings at 69, 70, identical in all essential particulars with the bearings for the ends of the member 49—50 hereinbefore explained in detail. The seats for the bearing sleeves of these bearings are formed in lugs upon the casing section 11, so that the said shaft is supported from the said section and in a position adjacent the open end thereof, and so that the axis of the shaft in question lies in about the plane of the joint 12 between the casing members, as best shown in Figures 3 and 5, and the said bearings are covered and protected by the sleeve or securing member 13 when the same is in place, as will be appreciated.

The invention to which this present application relates is in no way concerned with the mechanism whereby the odometer discs which form the sets 54, 55 are operated one from and by another, nor with the details of the resetting mechanism for setting the trip discs back to zero at the end of each trip. This invention does, however, comprehend the means for operating the resetting mechanism, the same comprising a reciprocating and rotary rod or resetting member 71 extending through and shown as having a tight bearing in the end wall 61 of the casing member 11, and the inner end of which member moves within and is guided by a tubular guide or bearing member 72 carried by a support 73, which support is secured to the inner surface of the said end wall by means of screws 74 so that the resetting member is supported from the end wall of the casing sections within which the odometer mechanism is located. The axis of the resetting member in question is porting member or bracket 27 having a vertically extending hollow stud shaft or bearing 28 about which the same rotates, and the said support or bracket being detachably secured to the free ends of pedestals 29 extending from the rear wall 21, as by means of screws 30. The inner end of the main driving shaft 22 preferably extends into a bearing provided in the supporting member 27, to thereby steady the same, as will be appreciated.

The bearing or support 27 is provided with arms 31, and these arms serve as supports for the lower ends of the side members 32 of a yoke, the upper portion 33 of which extends to a position over the stud shaft 28 and is provided with a jewel bearing at 34 for the upper end of a vertically extending pivot or shaft whereby the metallic speed indicating member or element of the instrument shown as in the form of a speed cup 35, upon which characters indicating the rate at which the vehicle is moving, are impressed, the lower end of the said shaft being supported in a jewel bearing carried by the stud shaft 28 to thereby support the said speed cup delicately, and permit it to move about its supporting pivot as an axis with a minimum of friction. The speed cup 35 and the yoke element 33 are provided each with a stop, which stops are adapted to engage with one another as indicated by the reference numeral 36, and a hair spring 37 is operatively connected with the speed cup 35 and acts in opposition to the forces tending to rotate the said member as the speed of the vehicle increases, and to return said member to its initial or zero speed position when the vehicle is at rest, as is usual in magnetic speedometers of the class to which my invention relates.

The rotating armature 26 is located within and moves in close proximity to the interior of the speed cup 35, and the poles of the C-shaped magnet 38 of the instrument lie opposite the periphery of the armature and closely adjacent the exterior of the speed cup, whereby and when the armature is rotated the speed cup will be moved away from its initial zero speed position and dragged along in opposition to the action of the hair spring 37, as the speed of the vehicle increases, the rotary or angular movement of the speed cup being proportionate to the rate of rotation of the armature which, in turn, is proportionate to the speed of the vehicle, as in magnetic speedometers of the type or class to which my invention relates.

The magnet 38 is supported at the middle portions of its two arms upon lugs 39 provided upon the interior of the section 10 of the casing and located one upon each side thereof, as by means of screws 40 and clips 41, and the said magnet is adapted to be rocked upon the said lugs as pivotal supports to thereby move the poles thereof toward or away from the periphery of the speed cup in calibrating the instrument, such rocking movement being imparted to the magnet by means of a screw 42 in threaded engagement with a yoke 43, see Figure 2, operatively connected with the lower end of the magnet and through which the said lower end may be moved to the left and the poles thereof moved closer to the speed cup 35, the movement of the parts in question in a reverse direction being produced by loosening the screw 42 and permitting the spring 44, normally under compression to expand. The yoke 43 is guided and kept in proper position by the side walls of a groove 45 formed in the inner surface of the casing member 10.

It will be appreciated from what has been thus far explained that the entire mechanism concerned with the rotation of the speed cup 35 into a position such that a member upon its periphery, and which indicates the speed at which the vehicle is running, may be seen through an opening in the end wall of the casing section 11, or, as otherwise stated, all the speed indicating elements and combinations of elements to that end are located within the casing member or section 10, and may be assembled and adjusted therein entirely independently of the casing member or section 11 and the odometer mechanism, which in a like manner is located entirely within the said last mentioned casing member. There is therefore no connection whatever between the speed indicating mechanism regarded in its entirety and which is located within the casing member 10, and the distance registering or odometer mechanism, similarly considered, which is located within the casing section 11, the only element of the instrument having an operative connection with both casing members being an odometer driving shaft 46 one end of which is supported in a bearing 47 carried by the end wall of the casing member 10, and the other end of which is supported in a bearing 48 carried by the end wall of the casing member 11, and the axis of which shaft is parallel with the axis of the main driving shaft 22.

It therefore follows that the complete speed indicating mechanism may be assembled in the casing section 10, and the complete odometer mechanism in the casing section 11, each mechanism entirely independent of the other, and the two sections then placed with their open ends in contact, and the sleeve or ring 13 then forced into place to thereby secure the casing members together and complete the assembling of the instrument, all as indicated in Figure 3 of the drawings.

It will furthermore be appreciated that the speed cup 35 and the elements directly conprovided to receive it; and indicating mechanism located within said casing and visible from a position outside the same.

4. In a device of the class described, two cup-shaped casing sections annular in cross-section the peripheral walls of which abut with one another whereby a hollow closed casing is provided and one of which members is provided with a circumferentially extending ledge or shoulder adjacent its open end, and with a key extending from said ledge; an annular securing member overlying the joint between said sections and the peripheral surface of the other of said sections and serving to hold said sections together, said securing member having an inwardly extending flange which abuts against said ledge and which flange is provided with a recess or notch to fit over said key; and a securing flange carried by said securing member and located at the end thereof opposite said inwardly extending flange, the inner portion of said securing flange where it merges with said annular securing member abutting against a peripherally extending flange carried by the second mentioned of the casing members aforesaid.

5. In a device of the class described, two casing sections the peripheral walls of which abut with one another whereby a hollow closed casing is provided, means for securing said casing sections together, speed indicating mechanism located within one of said sections, odometer mechanism located within the other of said sections, a main driving shaft supported in suitable bearings carried by said casing, and gearing through which both said speed indicating mechanism and said odometer mechanism are operated from said driving shaft.

6. In a device of the class described, two cup-shaped casing sections the peripheral walls of which abut with one another whereby a hollow closed casing is provided, means for securing said casing sections together, speed indicating mechanism located within one of said sections, odometer mechanism located within the other of said sections, a main driving shaft supported in a bearing carried by the end wall of the casing section which contains the speed indicating mechanism, gearing whereby said speed indicating mechanism is driven from said main driving shaft, an odometer driving shaft the ends of which are supported in two bearings carried one by each of said casing sections, gearing whereby said odometer driving shaft is driven from said main driving shaft, and gearing through which said odometer mechanism is driven from said odometer driving shaft.

7. In a device of the class described, two cup-shaped casing sections the peripheral walls of which abut with one another whereby a hollow closed casing is provided, means for securing said casing sections together, speed indicating mechanism located within one of said sections, odometer mechanism located within the other of said sections, a main driving shaft supported in a bearing carried by the end wall of the casing section which contains the speed indicating mechanism and the axis of which shaft extends at right angles to said end wall, gearing whereby said speed indicating mechanism is driven from said main driving shaft, an odometer driving shaft the axis of which is parallel with the axis of said main driving shaft, and the ends of which are supported in two bearings carried one by the end wall of each casing member, gearing whereby said odometer driving shaft is driven from said main driving shaft, and gearing through which said odometer mechanism is driven from said odometer driving shaft.

8. In a device of the class described, two cylindrical cup-shaped casing sections annular in cross-section and the peripheral walls of which abut with one another whereby a cylindrical hollow closed casing is provided, means for securing said casing sections together, speed indicating mechanism located within one of said sections, a main driving shaft supported in a bearing carried by the end wall of said casing section and the axis of which shaft coincides with the axis of said casing and whereby said speed indicating mechanisms is operated, odometer mechanism located within the other of said casing sections, a reciprocating and rotary odometer resetting member supported by the end wall of said last mentioned casing section and movable along and rotatable about an axis which coincides with the axis of said casing, and means whereby said odometer mechanism is driven from said main driving shaft.

9. In a device of the class described, two cylindrical cup-shaped casing sections annular in cross-section and the peripheral walls of which abut with one another whereby a cylindrical hollow closed casing is provided, means for securing said casing sections together, speed indicating mechanism located within one of said sections, a main driving shaft supported in a bearing carried by the end wall of said casing section and the axis of which shaft coincides with the axis of said casing and whereby said speed indicating mechanism is operated, odometer mechanism located within the other of said casing sections, an odometer driving shaft the axis of which is parallel with the axis of said casing, bearings carried one by said first mentioned and the other by said second mentioned casing section and whereby the ends of said odometer driving shaft are supported, gearing whereby said odometer driving shaft is driven from said main driving shaft, and gearing whereby said odometer mechanism is driven from said odometer driving shaft.

10. In a device of the class described, two cylindrical cup-shaped casing sections annular in cross-section and the peripheral walls of which abut with one another whereby a cylindrical hollow closed casing is provided, means for securing said casing sections together, speed indicating mechanism located within one of said sections, a main driving shaft supported in a bearing carried by the end wall of said casing section and the axis of which shaft coincides with the axis of said casing and whereby said speed indicating mechanism is operated, odometer mechanism located within the other of said casing sections and having a shaft arranged at right angles to the axis of said casing and the ends of which are supported in bearings carried by the peripheral wall thereof, and a plurality of odometer discs supported by said shaft, and means whereby said odometer mechanism is operated from said main driving shaft.

11. In a device of the class described, two cylindrical cup-shaped casing sections annular in cross-section and the peripheral walls of which abut with one another whereby a cylindrical hollow closed casing is provided, means for securing said casing sections together, speed indicating mechanism located within one of said sections, a main driving shaft supported in a bearing carried by the end wall of said casing section and the axis of which shaft coincides with the axis of said casing and whereby said speed indicating mechanism is operated, odometer mechanism located within the other of said casing sections and having a shaft arranged at right angles to the axis of said casing and the ends of which are supported in bearings carried by the peripheral wall thereof, and a plurality of odometer discs supported by said shaft, and an odometer driving shaft arranged parallel with the axis of said casing through which said odometer mechanism is driven from said main driving shaft.

12. In a device of the class described, two casing sections annular in cross-section and the peripheral walls of which abut with one another, whereby a hollow closed casing is provided; speed indicating mechanism located within one of said sections: a bearing carried by the end wall of said section; a main driving shaft rotatable in said bearing and the axis of which is at right angles to said end wall; odometer mechanism located within the other of said casing sections and having a shaft extending at right angles to said main driving shaft, and a plurality of odometer discs supported by said shaft; bearings carried by said second mentioned casing section and located at the joint between said casing section, and whereby the ends of said odometer shaft are supported; and an annular securing member overlying the joint between said casing sections and the bearing for said odometer shaft whereby said sections are held together.

13. In a device of the class described, a casing section; a bearing carried by the end wall of said section; a main driving shaft rotatable in said bearing; speed indicating mechanism located within said section and driven by said driving shaft; a combined pinion and gear member driven from said driving shaft and rotatable about an axis lying in a plane extending at right angles to said driving shaft; odometer mechanism operated by said combined pinion and gear member and two bearings supported from the end wall of said casing section and wherein the ends of said combined pinion and gear member are supported.

14. In a device of the class described, a casing section; a bearing carried by the end wall of said section; a main driving shaft rotatable in said bearing; speed indicating mechanism located within said section and driven by said driving shaft; a combined pinion and gear member driven from said driving shaft and rotatable about an axis lying in a plane extending at right angles to said driving shaft; odometer mechanism operated by said combined pinion and gear member; two lugs carried by the end wall of said casing section and having each a seat adapted to receive a bearing sleeve; and two bearing sleeves located one in each of said seats and which sleeves support the ends of said combined pinion and gear member, the form of said seats being such that the metal thereof may be swaged and made to overlie a portion of said bearing sleeves, to thereby hold them in place.

15. In a device of the class described, a cup-shaped casing section open at one end, and having an end wall at its other end, said end wall having an opening through which odometer mechanism may be read; odometer mechanism located within said section and having a shaft arranged parallel with the end wall thereof, and a plurality of odometer discs or wheels carried by said shaft; bearings carried by said casing section and wherein said speedometer shaft is rotatable; a centrally located reciprocating and rotatable resetting member supported in a bearing formed in the end wall of said section for resetting said odometer mechanism; and means for operating said odometer mechanism.

16. In a device of the class described, a metallic cup-shaped section having an end wall, and an opening therein; odometer mechanism assembled and held in place within said section, to thereby provide a unitary assemblage of elements complete in itself and adapted to be assembled with other elements to thereby provide a complete instrument; a centrally located tubular support carried by the end wall of said section, and the axis of which is disposed at right angles to said end wall; a reciprocating and rotary resetting member supported in said tubular support for resetting said odometer mechanism; and means for operating said odometer mechanism.

17. In a device of the class described, a substantially cylindrical casing having parallel end walls; one at each end thereof; a centrally located bearing carried by one of said end walls; a main driving shaft rotatable in said bearing and about an axis coincident with the axis of said casing; speed indicating mechanism located within said casing and operated by said driving shaft; and a centrally located resetting said casing and operated by said driving shaft; and a centrally located resetting member carried by the other end wall of said casing for resetting said odometer mechanism, said resetting member being rotatable about an axis coincident with the axis of said casing and with said main driving shaft.

18. In a device of the class described, a casing made up of two cup-shaped casing members, the open ends of which are secured together to thereby provide a substantially cylindrical casing; speed indicating and odometer mechanisms located within said casing; means for driving said mechanisms; a main driving shaft supported in a bearing carried by one of the end walls of said casing; and a resetting member supported by and rotatable in a bearing carried by the other end wall of said casing.

19. In a device of the class described, two casing sections annular in cross section and the peripheral walls of which abut with one another whereby a hollow closed casing is provided; and an annular securing member made from a magnetic material overlying the joint between said sections and whereby they are held together.

20. In a device of the class described, two casing sections annular in cross section and the peripheral walls of which abut with one another whereby a hollow closed casing is provided, and one of which members is provided with a circumferentially extending ledge or shoulder adjacent its open end; and an annular securing member made from iron or equivalent magnetic material overlying the joint between said sections, and having an inwardly extending flange adapted to abut against said ledge to thereby hold said sections together.

21. In a device of the class described, two casing sections annular in cross section and the peripheral walls of which abut with one another, whereby a hollow closed casing is provided; and an annular securing member made from iron or equivalent magnetic material overlying the joint between said sections and whereby said sections are held together, said securing member having a flange whereby the instrument may be secured in place in an opening provided to receive it.

In testimony whereof I affix my signature.

JOSEPH BERGE.